US006759102B2

(12) United States Patent
Murashiro et al.

(10) Patent No.: US 6,759,102 B2
(45) Date of Patent: *Jul. 6, 2004

(54) LIQUID CRYSTAL COMPOSITIONS AND LIQUID CRYSTAL DISPLAY DEVICES

(75) Inventors: Katsuyuki Murashiro, Chiba (JP); Yasuhiro Kubo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 10/132,854

(22) Filed: Apr. 26, 2002

(65) Prior Publication Data

US 2003/0085382 A1 May 8, 2003

(30) Foreign Application Priority Data

| Apr. 27, 2001 | (JP) | 2001-132751 |
| Mar. 5, 2002 | (JP) | 2002-059288 |
| Mar. 15, 2002 | (JP) | 2002-072221 |

(51) Int. Cl.⁷ .................. C09K 19/30; C09K 19/12; C09K 19/20
(52) U.S. Cl. .................. 428/1.1; 428/1.3; 252/299.63; 252/299.64; 252/299.66
(58) Field of Search .................. 252/299.63, 299.64, 252/299.66; 428/1.1, 1.3

(56) References Cited

U.S. PATENT DOCUMENTS

| 5,498,365 A | * | 3/1996 | Nolan et al. ............. 252/299.1 |
| 5,728,319 A | * | 3/1998 | Matsui et al. ........... 252/299.63 |
| 5,792,386 A | * | 8/1998 | Matsui et al. ........... 252/299.01 |
| 6,325,949 B1 | * | 12/2001 | Takeshita et al. ....... 252/299.63 |
| 6,497,929 B1 | * | 12/2002 | Miyairi et al. ................ 428/1.1 |

FOREIGN PATENT DOCUMENTS

| EP | 0 781 826 | 7/1997 |
| EP | 885271 | * 10/2001 |
| JP | 7-84254 | 3/1995 |
| JP | 9-176645 | 7/1997 |
| JP | 11-302653 | 11/1999 |

OTHER PUBLICATIONS

Yamaguchi, Y., et al. "Late–News Paper: Wide–Viewing–Angle Display Mode for the Active–Matrix LCD Using Bend–Alignment Liquid–Crystal Cell", Society for Information Display International Symposium (SID 1993), pp. 277–280.

Uchida, T., et al. "A Bright Reflective LCD Using Optically Compensated Bend Cell with Gray–Scale Capability and Fast Response", Society for Information Display International Symposium (SID 1996), pp. 618–621.

* cited by examiner

Primary Examiner—Shean C. Wu
(74) Attorney, Agent, or Firm—Wenderoth, Lind & Ponack, L.L.P.

(57) ABSTRACT

Liquid crystal compositions which comprise as a first component at least one compound selected from the group of compounds represented by the formula (I) and as a second component at least one compound selected from the group of compounds represented by the formula (II), the content of the first component being not less than 30% by weight based on the total weight of the composition

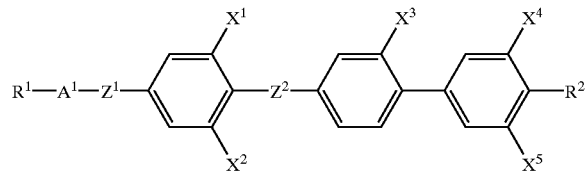

Formula (I)

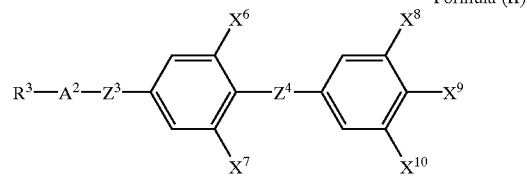

Formula (II)

wherein $R^1$ and $R^3$ are independently an alkyl of 1 to 10 carbon atoms and any —$CH_2$— in the alkyl may be replaced by —O— or —CH=CH—; $R^2$ is an alkyl of 1 to 10 carbon atoms, —F or —Cl; $X^1$, $X^2$, $X^3$, $X^4$, $X^5$, $X^6$, $X^7$, $X^8$ and $X^{10}$ are independently —F or —H; $X^9$ is —F, —Cl, —$CF_3$, —$OCF_3$ or —$OCF_2H$; $A^1$ and $A^2$ are independently 1,4-cyclohexylene, pyrimidine-2,5-diyl or 1,4-phenylene in which any —H may be replaced by —F; $Z^1$ and $Z^3$ are independently a single bond, —$(CH_2)_2$— or —$(CH_2)_4$—; $Z^2$ is a single bond or —$CF_2O$—; and $Z^4$ is a single bond, —COO— or —$CF_2O$—. These compositions have reduced response time and low threshold voltage, and are used in a liquid crystal display device, especially that of an OCB mode.

20 Claims, No Drawings

LIQUID CRYSTAL COMPOSITIONS AND LIQUID CRYSTAL DISPLAY DEVICES

TECHNICAL FIELD

This invention relates to liquid crystal compositions, liquid crystal display devices comprising said liquid crystal compositions and those of an OCB mode. For convenience, the liquid crystal composition of the present invention is sometimes expressed herein merely as the composition. Further, the compound represented by the formula (I) is sometimes expressed as Compound (I), and the compounds represented by other formulas are each sometimes expressed in this manner.

BACKGROUND ART

Practical application of a liquid crystal display device using an OCB (optically compensated bend) mode has been studied, because of its broad viewing angle and reduced response time. Recently, a liquid crystal composition having more reduced response time and being suitable for the OCB mode has been demanded so as to cope with an animation.

For conventional liquid crystal display devices of TFT (thin film transistor) drive, speeding up has been attempted using a TN (twisted nematic) mode, an IPS (in-plain switching) mode or a VA (vertical alignment) mode. However, displaying an animation as in CRT (cathode-ray tube) requires more reduced response time. Thus a liquid crystal composition and a liquid crystal display device with more reduced response time have been desired. The same applies to a liquid crystal display device of an OCB mode, for which a liquid crystal composition with a reduced response time is needed. Further, low power consumption in liquid crystal display devices has been attempted. To drive the liquid crystal display device at low voltage, a liquid crystal composition having low threshold voltage has been also desired.

The liquid crystal display devices of an OCB mode are disclosed in JP-A 7-84254 and Society for Information Display International Symposium (SID '93), 277 (1993). The liquid crystal compositions used in the liquid crystal display device of an OCB mode are disclosed in JP-A 9-176645 and JP-A 11-302653. The liquid crystal display devices of a reflection type R-OCB mode are disclosed, for example, in Society for Information Display International Symposium (SID '96), 618 (1996).

DISCLOSURE OF THE INVENTION

An object of the invention is to provide a liquid crystal composition having reduced response time and low threshold voltage and a liquid crystal display device using said composition, especially that of an OCB mode.

We have found that the liquid crystal composition of the present invention as described below has more reduced response time and lower threshold voltage as compared with conventional ones, the present composition can be suitably used in a liquid crystal display device, and that in particular a liquid crystal display device of an OCB mode. We have completed the present invention based on these findings.

The present invention resides in the following items 1 to 8.

(1) A liquid crystal composition which comprises as a first component at least one compound selected from the group of compounds represented by the formula (I) and as a second component at least one compound selected from the group of compounds represented by the formula (II), wherein the content of the first component is 30 to 95% by weight and the content of the second component is 5 to 70% by weight, based on the total weight of the composition

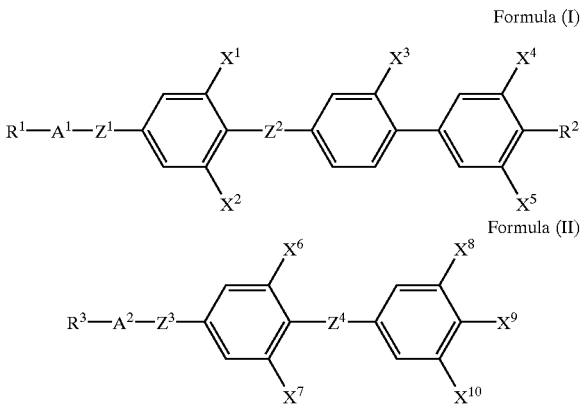

wherein $R^1$ and $R^3$ are independently an alkyl of 1 to 10 carbon atoms and any —$CH_2$— in the alkyl may be replaced by —O— or —CH=CH—; $R^2$ is an alkyl of 1 to 10 carbon atoms, —F or —Cl; $X^1$, $X^2$, $X^3$, $X^4$, $X^5$, $X^6$, $X^7$, $X^8$ and $X^{10}$ are independently —F or —H; $X^9$ is —F, —Cl, —$CF_3$, —$OCF_3$ or —$OCF_2H$; $A^1$ and $A^2$ are independently 1,4-cyclohexylene, pyrimidine-2,5-diyl or 1,4-phenylene in which any —H may be replaced by —F; $Z^1$ and $Z^3$ are independently a single bond, —$(CH_2)_2$— or —$(CH_2)_4$—; $Z^2$ is a single bond or —$CF_2O$—; and $Z^4$ is a single bond, —COO— or —$CF_2O$—.

The meaning of the expression "any —$CH_2$— in the alkyl may be replaced by —O— or —CH=CH—" as defined herein is illustrated by the following examples, to which the present invention is not limited. For the case of the alkyl being $C_4H_9$—, examples of the alkyl in which —$CH_2$— is replaced by —O— or —CH=CH— include $C_3H_7O$—, $CH_3$—$CH_2$—O—$CH_2$—, $CH_3$—O—$CH_{H2}$C=CH—$(CH_2)_3$—, $CH_3$—CH=CH—$(CH_2)_2$— and $H_2$C=CH—$(CH_2)_2$shown in these examples, the term "any" denotes "at least one". In view of the stability of the compound, $CH_3$—O—$CH_2$—O— wherein oxygens are not adjacent each other is more preferable than $CH_3$—O—O—$CH_2$— wherein oxygens are adjacent each other.

(2) The liquid crystal composition according to item 1, which further comprises as a third component at least one compound selected from the group of compounds of the formulas (III-1) and (III-2)

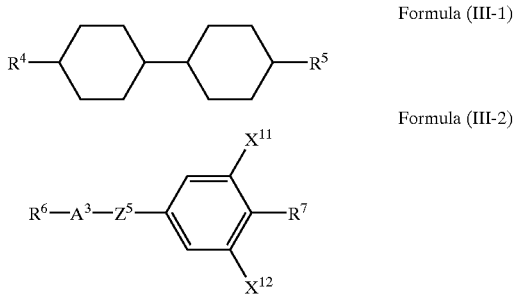

wherein $R^4$, $R^5$ and $R^6$ are independently an alkyl of 1 to 10 carbon atoms and any —$CH_2$— in the alkyl may be replaced by —O— or —CH=CH—; $R^7$ is an alkyl of 1 to 10 carbon atoms, an alkoxy of 1 to 10 carbon atoms, —F, —Cl or —OCF$_3$; A$^3$ is 1,4-cyclohexylene or 1,4-phenylene in which any —H may be replaced by —F; Z$^5$ is a single bond, —(CH$_2$)$_2$—, —COO— or —CF$_2$O—, and X$^{11}$ and X$^{12}$ are independently —F or —H.

(3) The liquid crystal composition according to item 1 wherein the first component is at least one compound selected from the group of compounds of the formulas (I-1) and (I-2)

Formula (I-1)

Formula (I-2)

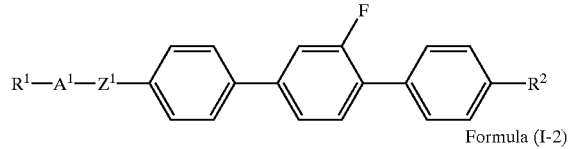

wherein R$^1$, A$^1$, Z$^2$, R$^2$, X$^4$ and X$^5$ each have the same meanings as defined in item 1.

(4) The liquid crystal composition according to item 1, wherein the second component is at least one compound selected from the group of compounds of the formulas (II-1), (II-2) and (II-3)

Formula (II-1)

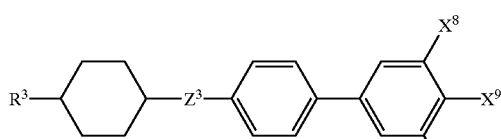

Formula (II-2)

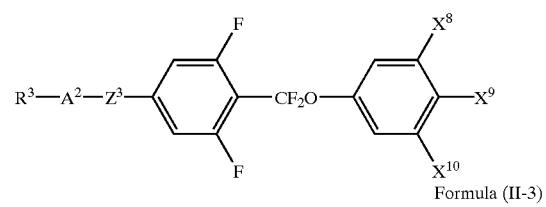

Formula (II-3)

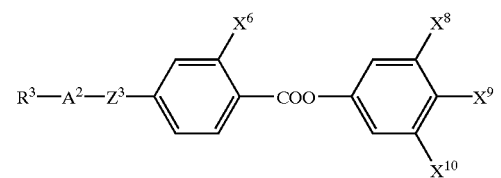

wherein R$^3$, X$^6$, X$^8$, X$^9$, X$^{10}$, A$^2$ and Z$^3$ each have the same meanings as defined in item 1.

(5) The liquid crystal composition according to item 2, wherein the content of the third component is 2 to 30% by weight based on the total weight of the composition.

(6) An application of the liquid crystal compositions according to any one of items 1 to 5, to a liquid crystal display device of an OCB mode.

(7) A liquid crystal display device containing a liquid crystal composition according to any one of items 1 to 5.

(8) A liquid crystal display device of an OCB mode containing a liquid crystal composition according to any one of items 1 to 5.

EMBODIMENTS FOR CARRYING OUT THE INVENTION

The effects achieved by each component in the present composition are explained below.

Compound (I) has relatively large optical anisotropy and high clearing point. This compound contributes to an increase in optical anisotropy and an elevation in a phase transition temperature of a nematic-isotropic liquid (clearing point: T$_{NI}$). Preferred examples of Compound (I) are shown below.

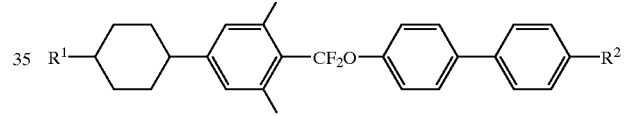

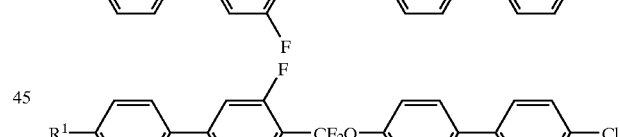

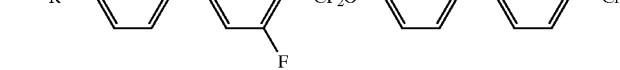

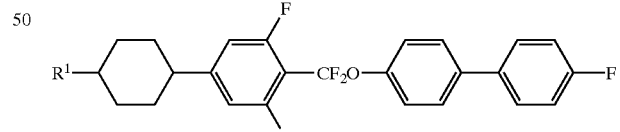

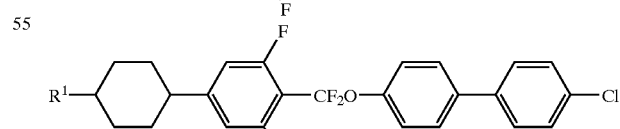

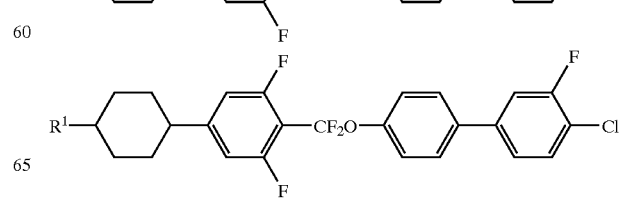

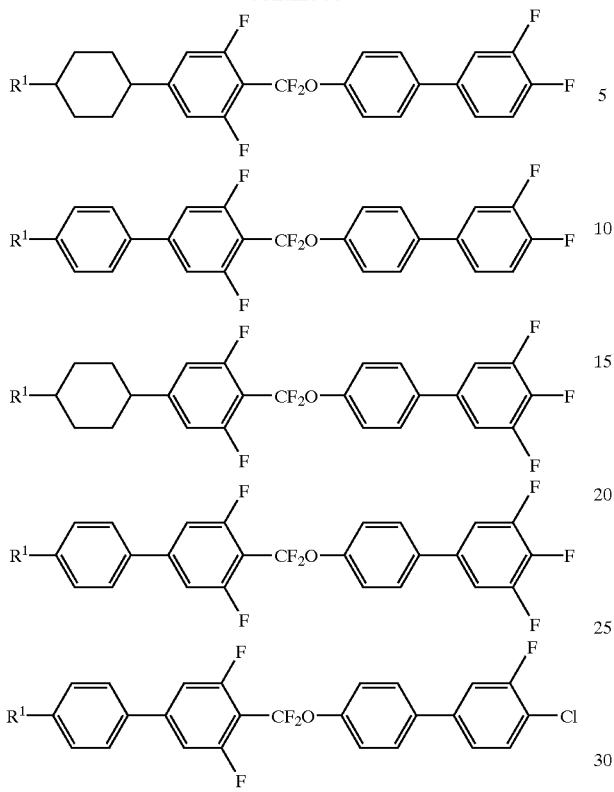

In the above compounds, $R^1$ has the same meaning as defined in item 1. Preferable $R^1$ includes an alkyl of 1 to 10 carbon atoms, an alkenyl of 2 to 11 carbon atoms or an alkoxy of 1 to 9 carbon atoms. Especially preferable $R^1$ is an alkyl of 2 to 7 carbon atoms.

Compound (II) has large dielectric anisotropy, and middle or large optical anisotropy. This compound increases the dielectric anisotropy of the composition without appreciable reduction in the optical anisotropy. Preferable examples of Compound (II) are shown below.

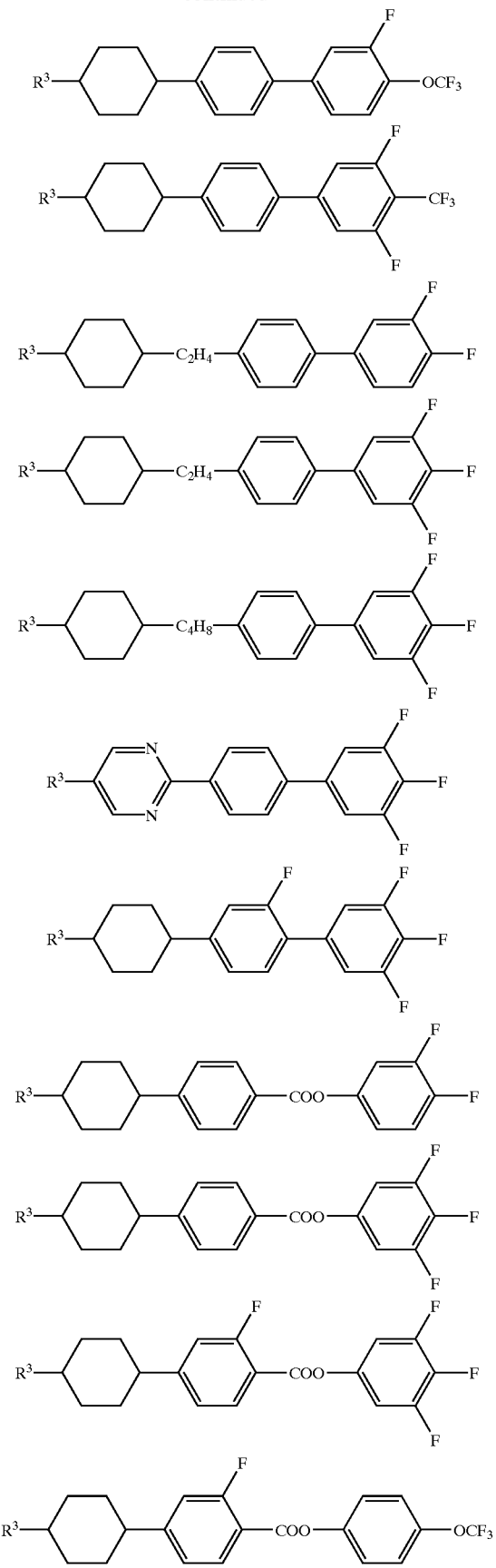

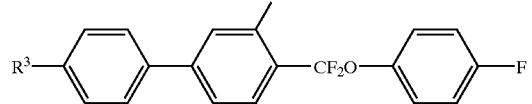

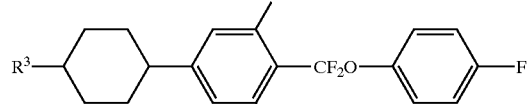

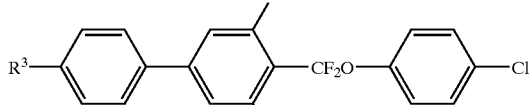

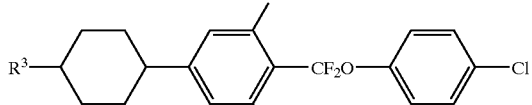

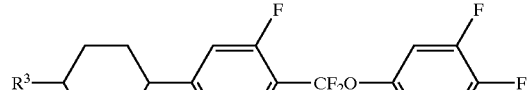

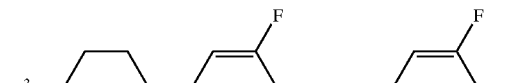

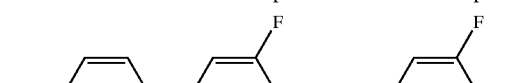

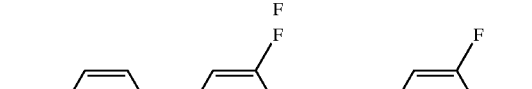

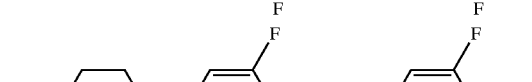

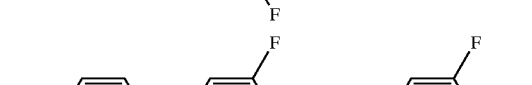

In the above compounds, $R^3$ has the same meaning as defined in item 1. Preferable $R^3$ includes an alkyl of 1 to 10 carbon atoms, an alkenyl of 2 to 11 carbon atoms or an alkoxy of 1 to 9 carbon atoms. Especially preferable $R^3$ is an alkyl of 2 to 7 carbon atoms.

Compound (III-1) and Compound (III-2) have low viscosity and low clearing point. These compounds are used for adjusting the clearing point of the composition, lowering the viscosity of the composition and improving the compatibility at low temperatures in the composition. Preferable examples of Compound (III-1) and Compound (III-2) are shown below.

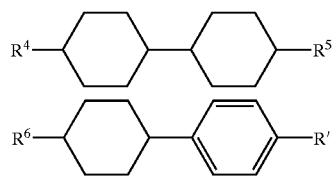

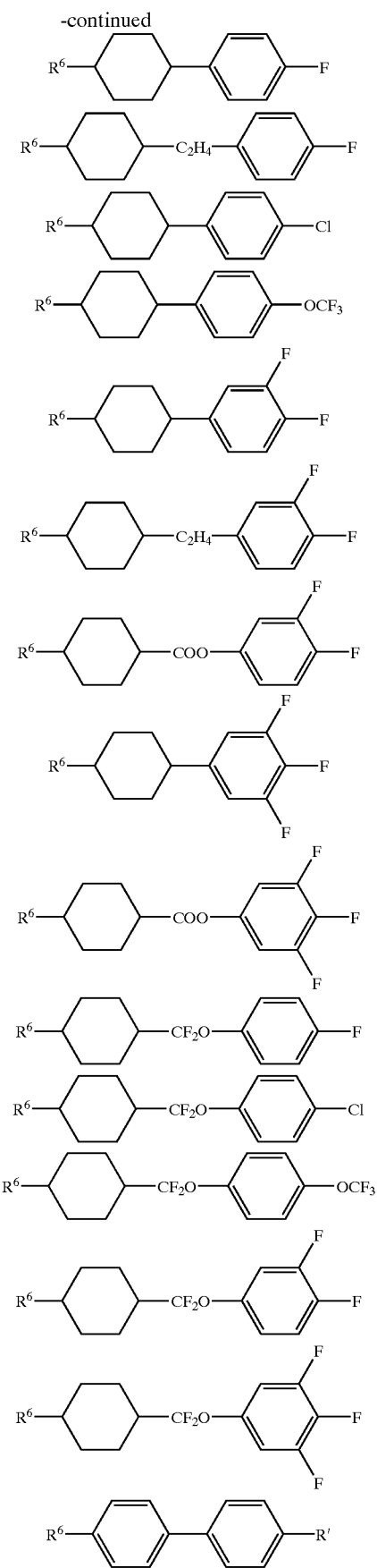

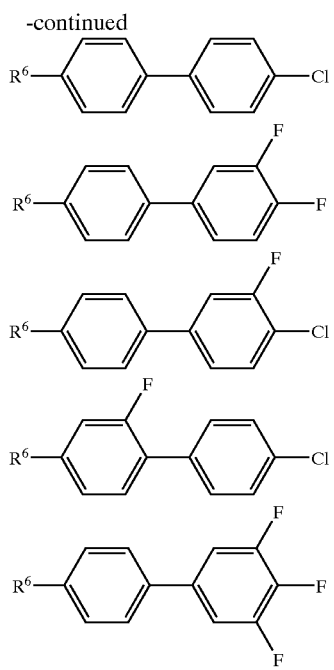

In the above formulas, R' is an alkyl of 1 to 10 carbon atoms or an alkoxy of 1 to 10 carbon atoms; $R^4$, $R^5$ and $R^6$ have the same meanings as defined in item 2 above. Preferable $R^4$, $R^5$ and $R^6$ include an alkyl of 1 to 10 carbon atoms or an alkenyl of 2 to 11 carbon atoms. Especially preferable $R^4$, $R^5$ and $R^6$ are an alkyl of 2 to 7 carbon atoms or an alkenyl of 2 to 7 carbon atoms.

When the composition consists essentially of the first component and the second component, the first component is 30 to 95% by weight and the second component is 5 to 70% by weight, based on the total weight of the composition. When the composition consists essentially of the first component, the second component and the third component, it is preferable that the first component is 30 to 95% by weight, the second component is 5 to 70% by weight and the third component is 2 to 30% by weight, based on the total weight of the composition. More preferably, the first component is 40 to 85% by weight, the second component is 15 to 60% by weight and the third component is 2 to 20% by weight, based on the total weight of the composition. It is desirable that each component comprises at least two compounds.

The composition may be mixed with other liquid crystalline compounds than the first, second and third components as mentioned above, unless they adversely influence the effect of the invention. Suitable additives may be added to the composition to adjust the physical properties. For the purpose of inducing a helical structure to a liquid crystal to adjust its twist angle, a chiral dopant such as cholesteryl nonanoate (CN) or the like may be added to the composition. The composition is prepared by mixing each component and heating the mixture to dissolve each other.

The above-mentioned composition is especially suitable for the liquid crystal display device of an OCB mode. The composition can also be used in the liquid crystal display devices of TN and IPS modes. Further, the composition can be used in the liquid crystal display devices of guest host mode and polymer dispersed liquid crystal.

EXAMPLES

The invention is further illustrated by the following examples and comparative examples. These examples are not to be construed to limit the scope of the invention.

The compounds as the components of the composition and the proportion thereof (% by weight) are first indicated and the physical properties of the composition are shown thereunder. The compounds are expressed by the symbols of left terminal group, bonding group, ring structure and right terminal group in accordance with the notation shown in the following Table 1. The configuration of 1,4-cyclohexylene is trans. The number in parenthesis corresponds to the number of the compound indicated in the present specification.

TABLE 1

Method for Description of Compounds Using Symbols
R—(A1)—Z1— . . . —Zn—(An)—X

| 1) Left Terminal Group R— | Symbol |
|---|---|
| $C_nH_{2n+1}$— | n— |
| $C_nH_{2n+1}O$— | nO— |
| $C_nH_{2n+1}OC_mH_{2m+1}$— | nOm— |
| $CH_2$=CH— | V— |
| $CH_2CHC_2H_{2n}$— | Vn— |
| $C_nH_{2n+1}CH$=$CHC_mH_{2m}$— | nVm— |
| $C_nH_{2n+1}CH$=$CHC_mH_{2m}CH$=$CHC_kH_{2k}$— | nVmVk— |

| 2) Ring Structure —An— | Symbol |
|---|---|
|  | B |
| 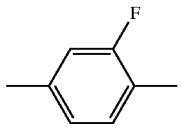 | B(F) |
| 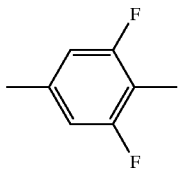 | B(F, F) |
| 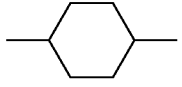 | H |
| 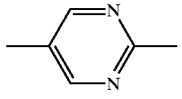 | Py |

| 3) Bonding Group —Zn— | Symbol |
|---|---|
| —$C_2H_4$— | 2 |
| —$C_4H_8$— | 4 |
| —COO— | E |
| —C≡C— | T |
| —CH=CH— | V |
| —$CF_2O$— | CF2O |
| —$OCF_2$— | OCF2 |

| 4) Right Terminal Group —X | Symbol |
|---|---|
| —F | —F |
| —Cl | —CL |
| —CN | —C |
| —$CF_3$ | —CF3 |
| —$OCF_3$ | —OCF3 |
| —$OCF_2H$ | —OCF2H |
| —$C_nH_{2n+1}$ | —n |
| —$OC_nH_{2n+1}$ | —On |
| —$COOCH_3$ | —EMe |
| —$C_nH_{2n}CH$=$CH_2$ | —nV |
| —$C_mH_{2m}CH$=$CHC_nH_{2n+1}$ | —mVn |

TABLE 1-continued

Method for Description of Compounds Using Symbols
R—(A1)—Z1— ... —Zn—(An)—X

| | |
|---|---|
| —CH=CF$_2$ | —VFF |
| —C$_n$H$_{2n}$CH=CF$_2$ | —nVFF |
| —C≡C—CN | —TC |

5) Examples of Description

Example 1. 3-H2B(F,F)B(F)—F

[Chemical structure: C$_3$H$_7$—cyclohexane—C$_2$H$_4$—benzene(F,F)—benzene(F)—F]

Example 2. 5-BB(F,F)CF2OBB(F)—CL

[Chemical structure: C$_5$H$_{11}$—benzene—benzene(F,F)—CF$_2$O—benzene—benzene(F)—Cl]

The measurement of the physical properties was carried out in the following manner. An upper limit temperature in a nematic phase (clearing point: T$_{NI}$) was determined by measuring the temperature at which the composition changes from a nematic phase to an isotropic liquid in the temperature elevating process, using a polarization microscope. A lower limit temperature in a nematic phase (T$_{CN}$) was determined by storing the composition in freezers controlled at 10° C., 0° C., -10° C., -20° C., -30° C. and -40° C., respectively, for 30 days, and then observing the liquid crystal phase of the composition. For example, when a liquid crystal composition remains in a nematic phase at -20° C., and changes to a crystal or a smectic phase at -30° C., T$_{CN}$ is then expressed as T$_{CN}$<-20° C.

An optical anisotropy (refractive index, Δn) was measured at 25° C. using a light of a wavelength at 589 nm. A threshold voltage (Vth) was measured at 25° C., by using a cell having a cell gap of (0.4/Δn) μm and a twist angle of 80 degrees. Δn is a value of an optical anisotropy. To this cell was applied a rectangular wave at a frequency of 32 Hz under the condition of a normally white mode. The threshold voltage (Vth) refers to a voltage applied when the light transmittance reaches 90%.

Response time (τ) was measured at 25° C., under the condition of a normally white mode using a display element having two polarized plates, in which a cell gap is (1.0/Δn) μm and the direction of rubbing on the upper and lower plates is the same. Δn is a value of an optical anisotropy. White (light passes through the element) was displayed in the bend alignment of liquid crystals by impressing voltage (Voff) to the element. Black (light is shut off by the element) was displayed by further impressing voltage (Von) to the element. Time (τ off) during which transmission was increased from 0% to 90% was measured by switching the impressed voltage from Voff to Von. Time (τ on) during which transmission was decreased from 100% to 10% was measured by switching the impressed voltage from Voff to Von. The response time is a sum of τon and τoff, unit being millisecond.

Example 1

| | | |
|---|---|---|
| 5-HBB(F)B-2 | (I) | 5% |
| 5-HBB(F)B-3 | (I) | 5% |
| 3-BB(F, F)CF2OBB-5 | (I) | 5% |
| 5-BB(F, F)CF2OBB-2 | (I) | 5% |
| 5-BB(F, F)CF2OBB-3 | (I) | 10% |
| 3-BB(F, F)CF2OBB—F | (I) | 10% |
| 3-HBB(F, F)—F | (II) | 15% |
| 5-HBB(F, F)—F | (II) | 15% |
| 3-BB(F, F)CF2OB(F, F)—F | (II) | 10% |
| 3-BB(F, F)CF2OB—F | (II) | 10% |
| 5-BB(F, F)CF2OB—F | (II) | 10% |

T$_{NI}$ = 117.5 (° C.); Δn = 0.187; Vth = 1.67 (V);
T$_{CN}$ <- 30 (° C.); τ = 7 (ms).

Example 2

| | | |
|---|---|---|
| 3-BB(F, F)CF2OBB-5 | (I) | 10% |
| 5-BB(F, F)CF2OBB-2 | (I) | 10% |
| 5-BB(F, F)CF2OBB-3 | (I) | 10% |
| 5-BB(F, F)CF2OBB-5 | (I) | 10% |
| 3-BB(F, F)CF2OBB—F | (I) | 20% |
| 3-BB(F, F)CF2OB(F)—F | (II) | 20% |
| 5-BB(F, F)CF2OB(F)—F | (II) | 10% |
| 3-BB(F, F)CF2OB—F | (II) | 10% |

T$_{NI}$ = 79.2 (° C.); Δn = 0.178; Vth = 1.15 (V);
T$_{CN}$ <- 20 (° C.); τ = 4.5 (ms).

Example 3

| | | |
|---|---|---|
| 5-HBB(F)B-2 | (I) | 10% |
| 5-HBB(F)B-3 | (I) | 10% |
| 2-BB(F, F)CF2OBB-5 | (I) | 5% |
| 5-BB(F, F)CF2OBB-3 | (I) | 5% |
| 3-HBB(F, F)—F | (II) | 10% |
| 3-HBB(F)—F | (II) | 15% |
| 2-BB(F, F)CF2OB(F, F)—F | (II) | 3% |
| 3-BB(F, F)CF2OB(F, F)—F | (II) | 15% |
| 5-BB(F, F)CF2OB(F, F)—F | (II) | 7% |

| -continued | | |
|---|---|---|
| 3-BB(F, F)CF2OB—CL | (II) | 10% |
| 5-BB(F, F)CF2OB—CL | (II) | 10% |
| $T_{NI}$ = 98.9 (° C.); Δn = 0.178; Vth = 1.65 (V); $T_{CN}$ <− 30 (° C.); τ = 4.9 (ms). | | |

Example 4

| | | |
|---|---|---|
| 3-BB(F, F)CF2OBB—F | (I) | 15% |
| 5-BB(F, F)CF2OBB—F | (I) | 15% |
| 3-BB(F, F)CF2OBB—CL | (I) | 10% |
| 4-BB(F, F)CF2OBB—CL | (I) | 10% |
| 5-BB(F, F)CF2OBB—CL | (I) | 10% |
| 5-HB(F, F)CF2OBB-2 | (I) | 2% |
| 3-HB(F, F)CF2OBB—F | (I) | 2% |
| 4-HB(F, F)CF2OBB—CL | (I) | 2% |
| 2-HBB(F, F)—F | (II) | 5% |
| 5-H2BB(F, F)—F | (II) | 5% |
| 4-HBB(F)—F | (II) | 5% |
| 3-H2BB(F)—F | (II) | 5% |
| 3-HB(F, F)CF2OB(F)—F | (II) | 5% |
| 5-HB(F, F)CF2OB(F, F)—F | (II) | 5% |
| 3-HB(F, F)CF2OB—F | (II) | 2% |
| 5-HB(F, F)CF2OB—CL | (II) | 2% |
| $T_{NI}$ = 88.2 (° C.); Δn = 0.171; Vth = 1.22 (V); $T_{CN}$ <− 30 (° C.); τ = 4.9 (ms). | | |

Example 5

| | | |
|---|---|---|
| 2-HB(F, F)CF2OBB(F)—F | (I) | 5% |
| 3-HB(F, F)CF2OBB(F)—F | (I) | 15% |
| 5-HB(F, F)CF2OBB(F)—F | (I) | 10% |
| 3-HB(F, F)CF2OBB(F, F)—F | (I) | 10% |
| 2-HBB(F)—F | (II) | 6% |
| 3-HBB(F)—F | (II) | 7% |
| 5-HBB(F)—F | (II) | 7% |
| 2-H2BB(F)—F | (II) | 10% |
| 3-H2BB(F)—F | (II) | 10% |
| 3-BB(F, F)CF2OB—OCF$_3$ | (II) | 5% |
| 5-BB(F, F)CF2OB—OCF$_3$ | (II) | 5% |
| 3-BB(F, F)CF2OB—F | (II) | 5% |
| 5-BB(F, F)CF2OB—F | (II) | 5% |
| $T_{NI}$ = 77.3 (° C.); Δn = 0.165; Vth = 1.05 (V); $T_{CN}$ <− 30 (° C.); τ = 5.3 (ms). | | |

Example 6

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 2-BB(F, F)CF2OBB—F | (I) | 5% |
| 3-BB(F, F)CF2OBB—F | (I) | 5% |
| 4-BB(F, F)CF2OBB—F | (I) | 5% |
| 5-BB(F, F)CF2OBB—F | (I) | 5% |
| 3-BB(F, F)CF2OBB—CL | (I) | 10% |
| 4-BB(F, F)CF2OBB—CL | (I) | 10% |
| 3-BB(F, F)CF2OB(F)—F | (II) | 10% |
| 5-BB(F, F)CF2OB(F)—F | (II) | 5% |
| 5-HBEB(F)—F | (II) | 3% |
| 3-HBEB(F, F)—F | (II) | 3% |
| 5-HB(F)EB(F, F)—F | (II) | 3% |
| 3-H4BB(F, F)—F | (II) | 3% |
| 3-PyBB(F, F)—F | (II) | 3% |
| $T_{NI}$ = 97.9 (° C.); Δn = 0.186; Vth = 1.11 (V); $T_{CN}$ <− 30 (° C.); τ = 6.5 (ms). | | |

Example 7

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 10% |
| 4-BB(F, F)CF2OBB—F | (I) | 10% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 4-BB(F, F)CF2OBB—CL | (I) | 5% |
| 5-BB(F, F)CF2OBB—CL | (I) | 5% |
| 3-BB(F, F)CF2OB(F)—F | (II) | 10% |
| 5-BB(F, F)CF2OB(F)—F | (II) | 10% |
| $T_{NI}$ = 101.9 (° C.); Δn = 0.201; Vth = 1.43 (V); $T_{CN}$ <− 30 (° C.); τ = 4.2 (ms). | | |

Example 8

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 10% |
| 4-BB(F, F)CF2OBB—F | (I) | 10% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 4-BB(F, F)CF2OBB—CL | (I) | 5% |
| 5-BB(F, F)CF2OBB—CL | (I) | 5% |
| 3-BB(F, F)CF2OB(F)—F | (II) | 10% |
| 5-BB(F, F)CF2OB(F)—F | (II) | 5% |
| 3-HH-4 | (III) | 5% |
| $T_{NI}$ = 103.2 (° C.); Δn = 0.195; Vth = 1.46 (V); $T_{CN}$ <− 30 (° C.); τ = 4.4 (ms). | | |

Example 9

| | | |
|---|---|---|
| 2-BB(F, F)CF2OBB-5 | (I) | 4% |
| 3-BB(F, F)CF2OBB-5 | (I) | 4% |
| 5-BB(F, F)CF2OBB-2 | (I) | 4% |
| 5-BB(F, F)CF2OBB-3 | (I) | 4% |
| 5-BB(F, F)CF2OBB-5 | (I) | 4% |
| 3-BB(F, F)CF2OBB—F | (I) | 10% |
| 4-BB(F, F)CF2OBB—F | (I) | 10% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 4-BB(F, F)CF2OBB—CL | (I) | 5% |
| 5-BB(F, F)CF2OBB—CL | (I) | 5% |
| 5-HB(F, F)CF2OBB(F)—F | (I) | 3% |
| 3-HB(F, F)CF2OBB(F, F)—F | (I) | 3% |
| 3-BB(F, F)CF2OBB(F)—F | (I) | 5% |
| 3-BB(F, F)CF2OBB(F, F)—F | (I) | 5% |
| 5-HB(F, F)CF2OBB(F)—CL | (I) | 3% |
| 4-BB(F, F)CF2OBB(F)—CL | (I) | 3% |
| 3-BB(F, F)CF2OB(F)—OCF$_3$ | (II) | 2% |
| 3-HB(F, F)CF2OB(F, F)—CF$_3$ | (II) | 2% |
| 4-HB(F, F)CF2OB(F)—CL | (II) | 2% |
| 3-BB(F, F)CF2OB(F)—CL | (II) | 2% |
| $T_{NI}$ = 110.0 (° C.); Δn = 0.197; Vth = 1.48 (V); $T_{CN}$ <− 40 (° C.); τ = 5 (ms). | | |

Example 10

| | | |
|---|---|---|
| 5-HBB(F)B-2 | (I) | 10% |
| 5-HBB(F)B-3 | (I) | 10% |
| 5-BB(F, F)CF2OBB-2 | (I) | 5% |
| 5-BB(F, F)CF2OBB-3 | (I) | 5% |
| 3-HBB(F, F)—F | (II) | 10% |
| 2-BB(F, F)CF2OB(F, F)—F | (II) | 3% |
| 3-BB(F, F)CF2OB(F, F)—F | (II) | 15% |
| 5-BB(F, F)CF2OB(F, F)—F | (II) | 7% |
| 3-BB(F, F)CF2OB—F | (II) | 10% |
| 5-BB(F, F)CF2OB—F | (II) | 10% |
| 2-HBB—F | (II) | 5% |
| 3-HBB—F | (II) | 5% |
| 5-HBB—F | (II) | 5% |
| $T_{NI}$ = 102.9 (° C.); Δn = 0.180; Vth = 1.69 (V); $T_{CN}$ <− 30 (° C.); τ = 7 (ms). | | |

Example 11

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 9% |
| 4-BB(F, F)CF2OBB—F | (I) | 9% |
| 5-BB(F, F)CF2OBB—F | (I) | 9% |
| 3-BB(F, F)CF2OBB—CL | (I) | 9% |
| 5-BB(F, F)CF2OBB—CL | (I) | 9% |
| 2-BB(F, F)CF2OB(F)—F | (II) | 10% |
| 5-BB(F, F)CF2OB(F)—F | (II) | 10% |
| 7-HB(F, F)—F | (III) | 2% |

-continued

| | | |
|---|---|---|
| 7-HB(F)—F | (III) | 3% |

$T_{NI}$ = 98.6 (° C.); Δn = 0.197; Vth = 1.57 (V);
$T_{CN}$ <− 30 (° C.); τ = 3.9 (ms).

Example 12

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 10% |
| 4-BB(F, F)CF2OBB—F | (I) | 5% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 5-BB(F, F)CF2OBB—CL | (I) | 5% |
| 2-BB(F, F)CF2OB(F)—F | (II) | 5% |
| 3-BB(F, F)CF2OB(F)—F | (II) | 5% |
| 4-BB(F, F)CF2OB(F)—F | (II) | 5% |
| 5-BB(F, F)CF2OB(F)—F | (II) | 5% |
| 3-HB—O2 | (III) | 2% |
| 5-HB—CL | (III) | 2% |
| 5-BB(F)—F | (III) | 3% |
| 7-BB—CL | (III) | 3% |

$T_{NI}$ = 91.1 (° C.); Δn = 0.180; Vth = 1.47 (V);
$T_{CN}$ <− 40 (° C.); τ = 6 (ms).

Example 13

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 10% |
| 4-BB(F, F)CF2OBB—F | (I) | 5% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 5-BB(F, F)CF2OBB—CL | (I) | 5% |
| 3-BB(F, F)CF2OB—F | (II) | 5% |
| 3-BB(F, F)CF2OB(F)—F | (II) | 5% |
| 5-BB(F, F)CF2OB(F)—F | (II) | 5% |
| 2-BB(F, F)CF2OB(F, F)—F | (II) | 5% |
| 7-HB-1 | (III) | 2% |
| 5-BB—O2 | (III) | 2% |
| 7-BB(F, F)—F | (III) | 2% |
| 5-BB—CL | (III) | 2% |
| 5-B(F)B—CL | (III) | 2% |

$T_{NI}$ = 90.9 (° C.); Δn = 0.181; Vth = 1.45 (V);
$T_{CN}$ <− 30 (° C.); τ = 6.2 (ms).

Example 14

| | | |
|---|---|---|
| 2-BB(F, F)CF2OBB-5 | (I) | 6% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 5-BB(F, F)CF2OBB-5 | (I) | 6% |
| 3-BB(F, F)CF2OBB—F | (I) | 10% |
| 4-BB(F, F)CF2OBB—F | (I) | 5% |
| 5-BB(F, F)CF2OBB—F | (I) | 10% |
| 2-BB(F, F)CF2OBB—CL | (I) | 5% |
| 3-BB(F, F)CF2OBB—CL | (I) | 5% |
| 5-BB(F, F)CF2OBB—CL | (I) | 5% |
| 2-BB(F, F)CF2OB(F)—F | (II) | 5% |
| 3-BB(F, F)CF2OB(F)—F | (II) | 5% |
| 4-BB(F, F)CF2OB(F)—F | (II) | 5% |
| 5-BB(F, F)CF2OB(F)—F | (II) | 5% |
| 5-HH-3 | (III) | 1% |
| 5-HH—O1 | (III) | 1% |
| 5-HEB(F, F)—F | (III) | 2% |
| 5-BB—O2 | (III) | 2% |
| 7-BB(F)—F | (III) | 2% |
| 5-BB—CL | (III) | 2% |

$T_{NI}$ = 92.6 (° C.); Δn = 0.180; Vth = 1.49 (V);
$T_{CN}$ <− 40 (° C.); τ = 5.7 (ms).

Example 15

| | | |
|---|---|---|
| 2-BB(F, F)CF2OBB-5 | (I) | 7% |
| 3-BB(F, F)CF2OBB-5 | (I) | 6% |
| 5-BB(F, F)CF2OBB-2 | (I) | 6% |
| 5-BB(F, F)CF2OBB-3 | (I) | 6% |
| 3-BB(F, F)CF2OBB—F | (I) | 9% |
| 4-BB(F, F)CF2OBB—F | (I) | 8% |
| 5-BB(F, F)CF2OBB—F | (I) | 8% |
| 3-BB(F, F)CF2OBB—CL | (I) | 8% |
| 5-BB(F, F)CF2OBB—CL | (I) | 7% |
| 2-BB(F, F)CF2OB—F | (II) | 4% |
| 3-BB(F, F)CF2OB—F | (II) | 5% |
| 3-BB(F, F)CF2OB(F, F)—F | (II) | 5% |
| 5-BB(F, F)CF2OB(F, F)—F | (II) | 5% |
| 5-HB—O2 | (III) | 2% |
| 3-HB—O2 | (III) | 2% |
| 5-BB(F, F)—F | (III) | 2% |
| 5-BB—CL | (III) | 2% |
| 5-B(F)B—CL | (III) | 2% |
| 3-HHB-1 | | 1.5% |
| 3-HHB-3 | | 1.5% |
| V—HHB-1 | | 1.5% |
| V2—HHB-1 | | 1.5% |

$T_{NI}$ = 92.9 (° C.); Δn = 0.175; Vth = 1.56 (V);
$T_{CN}$ <− 40 (° C.); τ = 6 (ms).

Example 16

| | | |
|---|---|---|
| 2-BB(F, F)CF2OBB-5 | (I) | 5% |
| 3-BB(F, F)CF2OBB-5 | (I) | 5% |
| 5-BB(F, F)CF2OBB-2 | (I) | 5% |
| 5-BB(F, F)CF2OBB-3 | (I) | 5% |
| 5-BB(F, F)CF2OBB-5 | (I) | 5% |
| 3-BB(F, F)CF2OBB—F | (I) | 9% |
| 4-BB(F, F)CF2OBB—F | (I) | 8% |
| 5-BB(F, F)CF2OBB—F | (I) | 8% |
| 2-BB(F, F)CF2OBB—CL | (I) | 5% |
| 3-BB(F, F)CF2OBB—CL | (I) | 5% |
| 5-BB(F, F)CF2OBB—CL | (I) | 5% |
| 3-BB(F, F)CF2OB—CL | (II) | 5% |
| 3-BB(F, F)CF2OB(F)—F | (II) | 5% |
| 5-BB(F, F)CF2OB(F)—F | (II) | 5% |
| 5-BB(F, F)CF2OB(F, F)—F | (II) | 5% |
| 5-HH—V | (III) | 2% |
| 3-HEB(F, F)—F | (III) | 2% |
| 5-BB-2 | (III) | 2% |
| 5-BB—CL | (III) | 2% |
| 5-BB(F, F)—F | (III) | 2% |
| 3-HBB-1 | | 3% |
| 5-HHB-2 | | 2% |

$T_{NI}$ = 92.1 (° C.); Δn = 0.177; Vth = 1.58 (V);
$T_{CN}$ <− 30 (° C.); τ = 5.8 (ms).

Example 17

| | | |
|---|---|---|
| 5-HBB(F)B-2 | (I) | 10% |
| 5-HBB(F)B-3 | (I) | 10% |
| 2-BB(F, F)CF2OBB-5 | (I) | 5% |
| 3-BB(F, F)CF2OBB-5 | (I) | 5% |
| 5-BB(F, F)CF2OBB-2 | (I) | 5% |
| 5-BB(F, F)CF2OBB-3 | (I) | 5% |
| 3-BB(F, F)CF2OBB—F | (I) | 5% |
| 5-BB(F, F)CF2OBB—F | (I) | 5% |
| 3-BB(F, F)CF2OBB—CL | (I) | 5% |
| 5-BB(F, F)CF2OBB—CL | (I) | 5% |
| 3-B(F)B(F)B—CL | (II) | 5% |
| 5-B(F)B(F)B—CL | (II) | 5% |
| 3-BB(F, F)CF2OB—F | (II) | 5% |
| 5-BB(F, F)CF2OB—CL | (II) | 5% |
| 3-BB(F, F)CF2OB(F)—F | (II) | 5% |
| 5-HH—V | (III) | 3% |
| 3-HB—O2 | (III) | 3% |
| 5-BB—O2 | (III) | 3% |
| 5-BB—CL | (III) | 3% |
| 5-B(F)B—CL | (III) | 3% |

$T_{NI}$ = 104.4 (° C.); Δn = 0.189; Vth = 1.35 (V);
$T_{CN}$ <− 30 (° C.); τ = 8 (ms).

Comparative Example 1

The following liquid crystal composition described in Example 6 of JP-A 9-176645 was prepared. This liquid crystal composition has longer response time than that of the present invention.

| | |
|---|---|
| 3-HHB(F, F)—F | 5.0% |
| 3-HH2B(F, F)—F | 10.0% |
| 5-HH2B(F, F)—F | 10.0% |
| 3-HBB(F, F)—F | 26.0% |
| 5-HBB(F, F)—F | 26.0% |
| 3-HHEB(F, F)—F | 10.0% |
| 3-HBEB(F, F)—F | 2.0% |
| 5-HBEB(F, F)—F | 2.0% |
| 3-HHBB(F, F)—F | 6.0% |
| $T_{NI}$ = 82.2 (° C.); Δn = 0.110; Vth = 1.38 (V); | |
| $T_{CN}$ <– 20 (° C.); τ = 16 (ms). | |

Comparative Example 2

The following liquid crystal composition described in Example 18 of JP-A 9-176645 was prepared. This liquid crystal composition has higher threshold voltage than that of the present invention.

| | |
|---|---|
| 7-HB(F, F)—F | 7.0% |
| 2-BTB—O1 | 11.0% |
| 3-HB—O2 | 3.0% |
| 2-HBB(F)—F | 12.0% |
| 3-HBB(F)—F | 11.0% |
| 5-HBB(F)—F | 10.0% |
| 3-HBB(F, F)—F | 10.0% |
| 5-HBB(F, F)—F | 11.0% |
| 3-H2BTB-2 | 3.0% |
| 3-H2BTB-3 | 4.0% |
| 3-HB(F)TB-2 | 6.0% |
| 3-HB(F)TB-3 | 6.0% |
| 3-HB(F)TB-4 | 6.0% |
| $T_{NI}$ = 96.1 (° C.); Δn = 0.179; Vth = 2.01 (V); | |
| $T_{CN}$ <– 20 (° C.); τ = 10 (ms). | |

Industrial Applicability

The present invention can provide the liquid crystal composition having short response time and low threshold voltage, and the liquid crystal display device composed of said composition, especially that of an OCB mode.

What is claimed is:

1. A liquid crystal composition which comprises as a first component at least one compound selected from the group of compounds represented by the formula (I) and as a second component at least one compound selected from the group of compounds represented by the formula (II), wherein the content of the first component is 30 to 95% by weight and the content of the second component is 5 to 70% by weight, based on the total weight of the composition

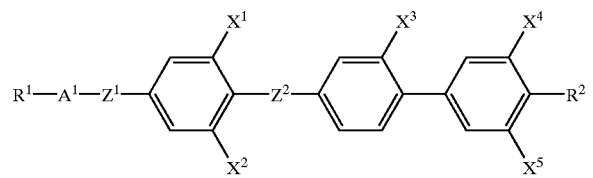

Formula (I)

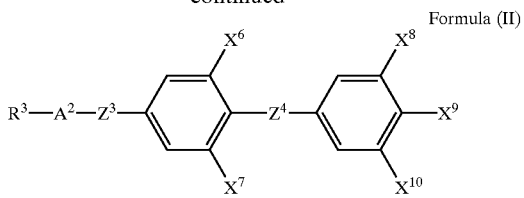

Formula (II)

wherein $R^1$ and $R^3$ are independently an alkyl of 1 to 10 carbon atoms and any —$CH_2$— in the alkyl may be replaced by —O— or —CH=CH—; $R^2$ is an alkyl of 1 to 10 carbon atoms, —F or —Cl; $X^1$, $X^2$, $X^3$, $X^4$, $X^5$, $X^6$, $X^7$, $X^8$ and $X^{10}$ are independently —F or —H, wherein at least one of $X^1$, $X^2$ and $X^3$ is —F; $X^9$ is —F, —Cl, —$CF_3$, —$OCF_3$ or —$OCF_2H$; $A^1$ is 1,4-cyclohexylene, or 1,4-phenylene in which any —H may be replaced by —F; $A^2$ is 1,4-cyclohexylene, pyrimidine-2,5-diyl or 1,4-phenylene in which any —H may be replaced by —F; $Z^1$ and $Z^3$ are independently a single bond, —$(CH_2)_2$— or —$(CH_2)_4$—; $Z^2$ is a single bond or —$CF_2O$—; and $Z^4$ is a single bond, —COO— or —$CF_2O$—.

2. The liquid crystal composition according to claim 1, which further comprises as a third component at least one compound selected from the group of compounds of the formulas (III-1) and (III-2)

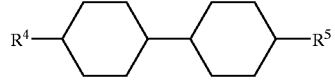

Formula (III-1)

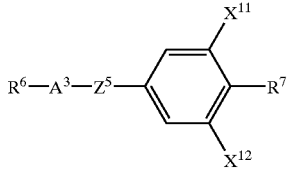

Formula (III-2)

wherein $R^4$, $R^5$ and $R^6$ are independently an alkyl of 1 to 10 carbon atoms and any —$CH_2$— in the alkyl may be replaced by —O— or —CH=CH—; $R^7$ is an alkyl of 1 to 10 carbon atoms, an alkoxy of 1 to 10 carbon atoms, —F, —Cl or —$OCF_3$; $A^3$ is 1,4-cyclohexylene or 1,4-phenylene in which any —H may be replaced by —F; $Z^5$ is a single bond, —$(CH_2)_2$—, —COO— or —$CF_2O$—, and $X^{11}$ and $X^{12}$ are independently —F or —H.

3. The liquid crystal composition according to claim 1, wherein the first component is at least one compound selected from the group of compounds of the formulas (I-1) and (I-2)

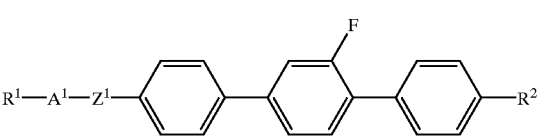

Formula (I-1)

-continued

Formula (I-2)

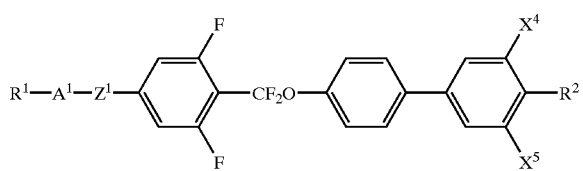

wherein $R^1$, $A^1$, $Z^1$, $R^2$, $X^4$ and $X^5$ each have the same meanings as defined in claim 1.

4. The liquid crystal composition according to claim 1, wherein the second component is at least one compound selected from the group of compounds of the formulas (II-1), (II-2) and (II-3)

Formula (II-1)

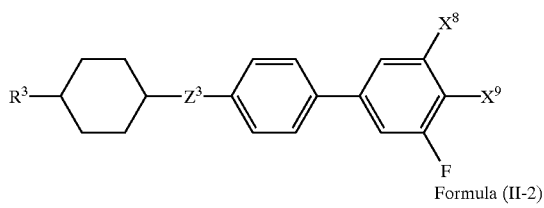

Formula (II-2)

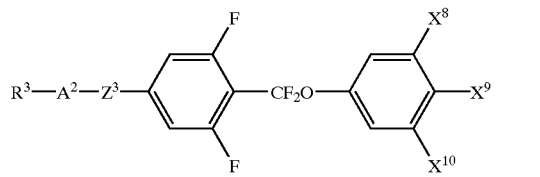

Formula (II-3)

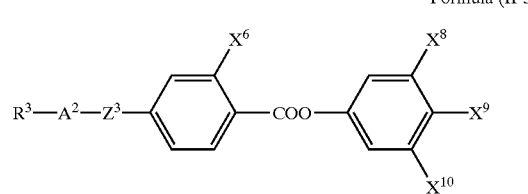

wherein $R^3$, $X^6$, $X^8$, $X^9$, $X^{10}$, $A^2$ and $Z^3$ each have the same meanings as defined in claim 1.

5. The liquid crystal composition according to claim 2, wherein the content of the third component is 2 to 30% by weight based on the total weight of the composition.

6. A method which comprises applying the liquid crystal composition according to claim 1, to a liquid crystal display device of an OCB mode.

7. A liquid crystal display device containing a liquid crystal composition according to claim 1.

8. A liquid crystal display device of an OCB mode containing a liquid crystal composition according to claim 1.

9. A method which comprises applying the liquid crystal composition according to claim 2, to a liquid crystal display device of an OCB mode.

10. A method which comprises applying the liquid crystal composition according to claim 3, to a liquid crystal display device of an OCB mode.

11. A method which comprises applying the liquid crystal composition according to claim 4, to a liquid crystal display device of an OCB mode.

12. A method which comprises applying the liquid crystal composition according to claim 5, to a liquid crystal display device of an OCB mode.

13. A liquid crystal display device containing a liquid crystal composition according to claim 2.

14. A liquid crystal display device containing a liquid crystal composition according to claim 3.

15. A liquid crystal display device containing a liquid crystal composition according to claim 4.

16. A liquid crystal display device containing a liquid crystal composition according to claim 5.

17. A liquid crystal display device of an OCB mode containing a liquid crystal composition according to claim 2.

18. A liquid crystal display device of an OCB mode containing a liquid crystal composition according to claim 3.

19. A liquid crystal display device of an OCB mode containing a liquid crystal composition according to claim 4.

20. A liquid crystal display device of an OCB mode containing a liquid crystal composition according to claim 5.

* * * * *